Patented Nov. 7, 1950

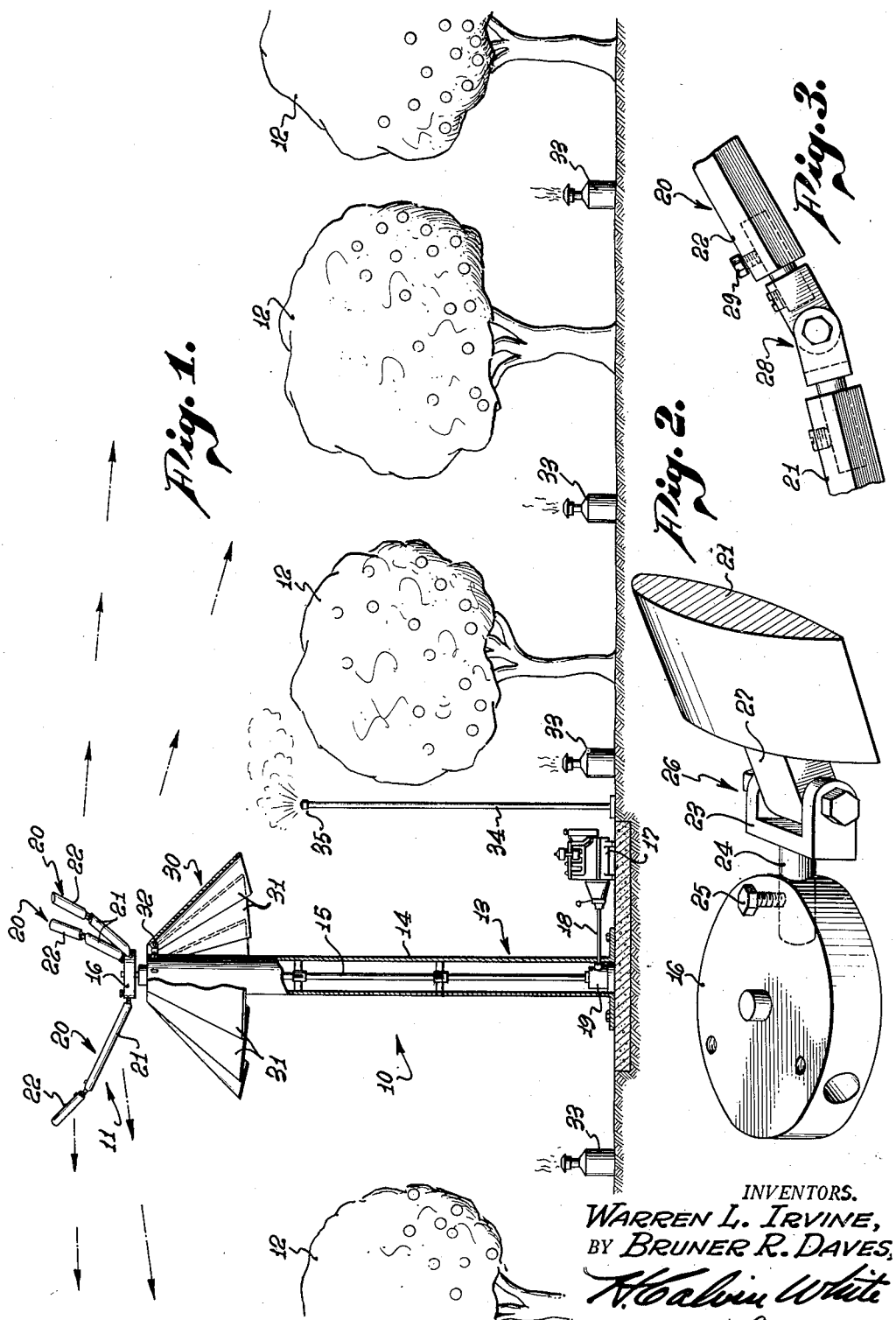

2,529,339

UNITED STATES PATENT OFFICE 2,529,339

BLOWER FOR FROST PREVENTION

Warren L. Irvine and Bruner R. Daves, Claremont, Calif.

Application March 8, 1949, Serial No. 80,194

6 Claims. (Cl. 47—2)

1

This invention has to do generally with improved orchard protective systems, with particular though typical applicability to citrus orchards, and has for its general purpose to assure more effective and less troublesome conditioning of atmospheric conditions directly affecting the trees, than has proven possible by any of the conventional expedients.

The two principal practices in attempting frost protection of orchards has been the use of heaters or smudge pots, and wind machines operating to mechanically force air circulation in the orchard, and apparently on the theory that air movement in and of itself (assuming temperature conditions to remain the same) will prevent frost injury.

The numerous objections to the use of orchard heaters are of course notorious. For present purposes it will suffice to point to the extremely low heating efficiency of the heaters, resulting from the fact that from each heater, the bulk of the heat rises vertically and is lost to the atmosphere above the trees, whereas only a small proportion is transmitted laterally within the orchard and where most needed.

The conventional wind machines have one or more high speed propellers operating about horizontal or inclined axes to project the air at such high velocities as will cause movement of the atmospheric air at maximum distances. Such machines have relatively little effect toward favoring the actual temperature of the tree atmospheres, and have a distinct disadvantage in creating air flow so directed and of such high velocities as to injure the trees.

In one of its major aspects, the invention is predicated upon conditioning of the orchard atmosphere by the formation of a ceiling air barrier, the effect of which is to substantially confine and therefore maintain a created condition of the tree atmosphere below. Among the most important purposes of the invention is that of protecting the orchard against frost injury, a purpose accomplished by maintaining above the trees a blanket or barrier of air flowing radially outwardly over the trees and continuously about a central location at a velocity sufficiently high to effectively resist passage of warm air upwardly through the barrier thus created, and yet sufficiently low to prevent injury to the trees. Thus we are able to confine within the immediate atmosphere of the trees a considerable portion of the heat which normally is lost, as indicated above, and to maintain a condition of air movement which itself will not injure the trees. The orchard atmosphere below the air barrier may be conditioned in any desired manner, as by the use of heaters during low temperature periods, or by humidifying the air during hot weather.

In its structural aspects, the invention contemplates a departure from the conventional wind machines, in that the air movement is created by a blower mounted for rotation about a vertical axis and having multiple blades so designed and arranged as to displace the air continuously to a wide radial extent about the blower, and predominately at an elevation above the orchard trees. Particularly contemplated is the use of a blower having blades extending at varying upward and outward angularity to present the sequence of pressure angles required for displacement of the air to a large radial distance.

Further features and objects of the invention, as well as the details of a typical embodiment will be clearly understood from the following detailed description of the accompanying drawing, in which:

Fig. 1 is a general view illustrating the blower installation in an orchard;

Fig. 2 is a fragmentary view illustrating the adjustable connections between the rotor hub and blades; and Fig. 3 is a fragmentary view typifying the adjustable connection between the blade sections.

Referring first to the general showing of Fig. 1, an individual blower unit generally indicated at 10 (a number of which may be installed at spaced locations depending upon the size of the orchard) is shown to comprise the blower proper or rotor 11 mounted at an elevation above the orchard trees 12, on a suitable base structure 13. Typically, the base is shown to comprise a tubular vertical column 14 containing a drive shaft 15 running up to the rotor hub 16. The shaft is suitably driven, as by engine or motor 17, the drive from which is transmitted through shaft 18 and gear box 19 to the lower shaft 15.

In broad contemplation of the invention, the rotor and blade assembly 11 may be of any suitable form and construction, so designed as to project the air in a circularly continuous stream radially outward from the blower, and in a course of flow preponderantly horizontally above the trees. The blower is shown typically to have three equi-angularly spaced blades 20, each including an inner length 21 extending upwardly and outwardly at lesser angularity, and an outer section 22 having relatively greater angularity. The blade angularities are determined in accordance with the desired course to be taken by the projected air stream in maintenance of an effective ceiling over the orchard trees. As the drawing indicates, the inner blade extents 21 tend to displace the air outwardly and over the more proximate trees, while the outer extents 22, by reason of their greater pressure angle, force the air in a general course of flow above and radially beyond the air displacement created by the inner extents of the blade.

If desired, provision may be made for adjustably varying the pitches of the individual blades and their sections, as well as their relative angularities. Merely as illustrative of many known adjustable mechanical connections, the blades are shown to be attached to the hub 16 through bifurcated connections 23, each having a trunnion 24 retained by key or set screw 25 in a position of angular adjustment required for the desired blade pitch. Each blade is bodily adjustable to vary its vertical angularity, as by clamp-type pivot, generally indicated at 26, securing the connection 23 to the blade shank 27. As illustrated in Fig. 3, the outer blade section 22 is angularly adjustable relative to the inner section 21 as by a clamp-type pivot 28, similar to the aforementioned pivot 26, and the pitch of section 22 is individually variable by adjusted setting of the key or screw 29.

For maintenance of the blower-projected air stream in its intended outward flow, it may be desirable to baffle the air directly below the blower. Accordingly, as an illustrative deflector, we show an iris-type baffle assembly, generally indicated at 30, comprising a circular series of overlapping individual baffles or vanes 31 extending downwardly and outwardly and attached at 32 to the top of the column 14.

Maintenance of the continuously displaced air ceiling above the orchard greatly enhances the confineability of an atmospheric condition created below and in the direct vicinity of the trees 12. During low temperature conditions, the lower orchard atmosphere may be warmed in any suitable manner, as by heaters 33 distributed at appropriate intervals. Upon rising, the warm air meets the air stream ceiling created by the blower, which presents a substantial barrier to passage of heat above the air ceiling. Consequently, a considerable proportion of heat otherwise lost, is confined and dispersed horizontally within and throughout the immediate atmosphere of the trees.

During hot weather periods it may be desirable to otherwise condition the air about the orchard trees, and specifically by humidifying the air to a degree favoring protection of the tree foliage. The atmosphere below the blower elevation may be fogged with water fed, for example, through pipe 34 to spray nozzle 35 at a height such that the moisture will be carried outwardly through the orchard, while for the most part confined below the blower-displaced air stream.

Particular advantages with respect to the maintenance of the desired conditioning of the atmosphere at the tree elevation, are achieved by reason of the displacement of a confining air current ceiling by a blower assembly of the type described. In distinction to the usual wind machines from which the air stream is at any instance confined to a particular direction, here the air displacement occurs continuously and completely about the blower. Consequently, once the machine is put in operation, there is relatively little atmospheric air inertia to be overcome, since the flow in all directions is continuous, and therefore it is possible to project the air over a wide radial extent while maintaining the blower at a relatively low speed, and below any speed at which the air velocity could injure the trees.

We claim:

1. An orchard protective blower mounted at an elevation above the orchard trees and comprising a rotor having radial blades rotatable about a vertical axis, each blade being pitched at an angle to have leading and trailing edges, and each blade having an inner upwardly and outwardly extending portion and an outer portion extending at an increased upward angularity in relation to said inner portion so that air is displaced by the blade, and from radially increasing locations along the blade, increasing distances outwardly over the orchard trees by virtue of the upward angularities of the blades.

2. An orchard protective blower mounted at an elevation above the orchard trees and comprising a rotor having three equi-angularly arranged radial blades rotatable about a vertical axis, each blade being pitched at an angle to have leading and trailing edges, and each blade having an inner upwardly and outwardly extending portion and an outer portion extending at an increased upward angularity in relation to said inner portion so that air is displaced by the blade, and from radially increasing locations along the blade, increasing distances outwardly over the orchard trees by virtue of the upward angularities of the blades.

3. An orchard protective blower mounted at an elevation above the orchard trees and comprising a rotor having radial blades rotatable about a vertical axis, each blade being pitched at an angle to have leading and trailing edges, and each blade having an inner upwardly and outwardly extending length and a terminal length extending upwardly and outwardly relative to said inner length, air being displaced by the blade, and from radially increasing locations along the blade, increasing distances outwardly over the orchard trees by virtue of the upward angularities of the blades.

4. An orchard protective blower mounted at an elevation above the orchard trees and comprising a rotor having radial blades rotatable about a vertical axis, each blade being pitched at an angle to have leading and trailing edges, and each blade having a substantially straight inner upwardly and outwardly extending length and a shorter substantially straight terminal length extending upwardly and outwardly relative to said inner length, air being displaced by the blade, and from radially increasing locations along the blade, increasing distances outwardly over the orchard trees by virtue of the upward angularities of the blades.

5. An orchard protective blower mounted at an elevation above the orchard trees and comprising a rotor having radial blades rotatable about a vertical axis, each blade being pitched at an angle to have leading and trailing edges, and each blade having an inner upwardly and outwardly extending length and a terminal length extending upwardly and outwardly relative to said inner length, air being displaced by the blade, and from radially increasing locations along the blade, increasing distances outwardly over the orchard trees by virtue of the upward angularities of the blades, and means for adjusting the relative pitches of said inner and terminal lengths of the blades.

6. An orchard protective blower mounted at an elevation above the orchard trees and comprising a rotor having radial blades rotatable about a vertical axis, each blade being pitched at an angle to have leading and trailing edges, each blade having an inner upwardly and outwardly extending portion and an outer portion extending at an increased upward angularity in relation to said inner portion so that air is displaced by the blade, and from radially increasing locations along the blade, increasing distances outwardly over the orchard trees by virtue of the upward angularities of the blades, and an annular downwardly and outwardly inclined baffle mounted coaxially with and directly below the blower.

WARREN L. IRVINE.
BRUNER R. DAVES.

REFERENCES CITED

The following references are of record in the file of this patent:

UNITED STATES PATENTS

| Number | Name | Date |
|---|---|---|
| 1,398,927 | Whitlock | Nov. 29, 1921 |
| 1,688,802 | Crowhurst | Oct. 23, 1928 |
| 1,991,851 | Hammell | Feb. 19, 1935 |
| 2,165,148 | Nelson | July 4, 1939 |

FOREIGN PATENTS

| Number | Country | Date |
|---|---|---|
| 14,309 | Australia | of 1923 |